United States Patent [19]

Wickham

[11] Patent Number: 4,493,511
[45] Date of Patent: Jan. 15, 1985

[54] COMBINED BC PRESSURE-MAINTAINING VALVE AND QUICK SERVICE BULB EXHAUST VALVE

[75] Inventor: David J. Wickham, Chippenham, England

[73] Assignee: Westinghouse Brake and Signal Co. Ltd., Chippenham, England

[21] Appl. No.: 416,073

[22] Filed: Sep. 8, 1982

[30] Foreign Application Priority Data

Sep. 11, 1981 [GB] United Kingdom ............... 8127543

[51] Int. Cl.³ .................... B60T 15/52; B60T 17/00
[52] U.S. Cl. .................................. 303/36; 303/60; 303/69
[58] Field of Search ............ 303/86, 81, 25–27, 303/60, 59, 66, 70, 72–80, 35, 36, 37, 38, 46, 85, 39, 44, 69, 68

[56] References Cited

U.S. PATENT DOCUMENTS

| | | | |
|---|---|---|---|
| 2,880,039 | 3/1959 | Hursen et al. | 303/60 |
| 4,050,745 | 9/1977 | Wickham | 303/36 |
| 4,073,544 | 2/1978 | Hart | 303/38 X |

Primary Examiner—Douglas C. Butler
Attorney, Agent, or Firm—Larson and Taylor

[57] ABSTRACT

This invention relates to a valve assembly for a railway braking system, including a brake cylinder pressure-maintaining valve which, during brake application, takes air from the brake pipe and feeds it into the brake cylinder until it reaches minimum brake pressure. To avoid the need for an extra valve, the brake cylinder pressure-maintaining valve is used as a quick service bulb exhaust valve during brake release and member are provided to ensure that the brake cylinder pressure maintaining valve opens immediately on brake release. Once the brakes have been applied, pressure in the brake cylinder is maintained from the quick service bulb 59. Brake cylinder exhaust pressure taken from a point 124 after the brake cylinder exhaust valve 50, but before the brake cylinder exhaust choke 70, is directed to chamber G above the inshot and brake cylinder-maintaining valve diaphragm 131. Since the pressure in port 124 upstream of the brake cylinder exhaust choke 70 attains a pressure well within 10 p.s.i. of chamber H, the spring 67 in chamber G can open the brake cylinder maintaining valve 64. Thus, immediate opening of brake cylinder-maintaining valve 64 occurs when the bi-stable operator moves to the release position. Bulb pressure from QS bulb 59 is then able to flow via the BC maintaining choke 65 and fall with the fall of brake cylinder pressure in port 120.

3 Claims, 1 Drawing Figure

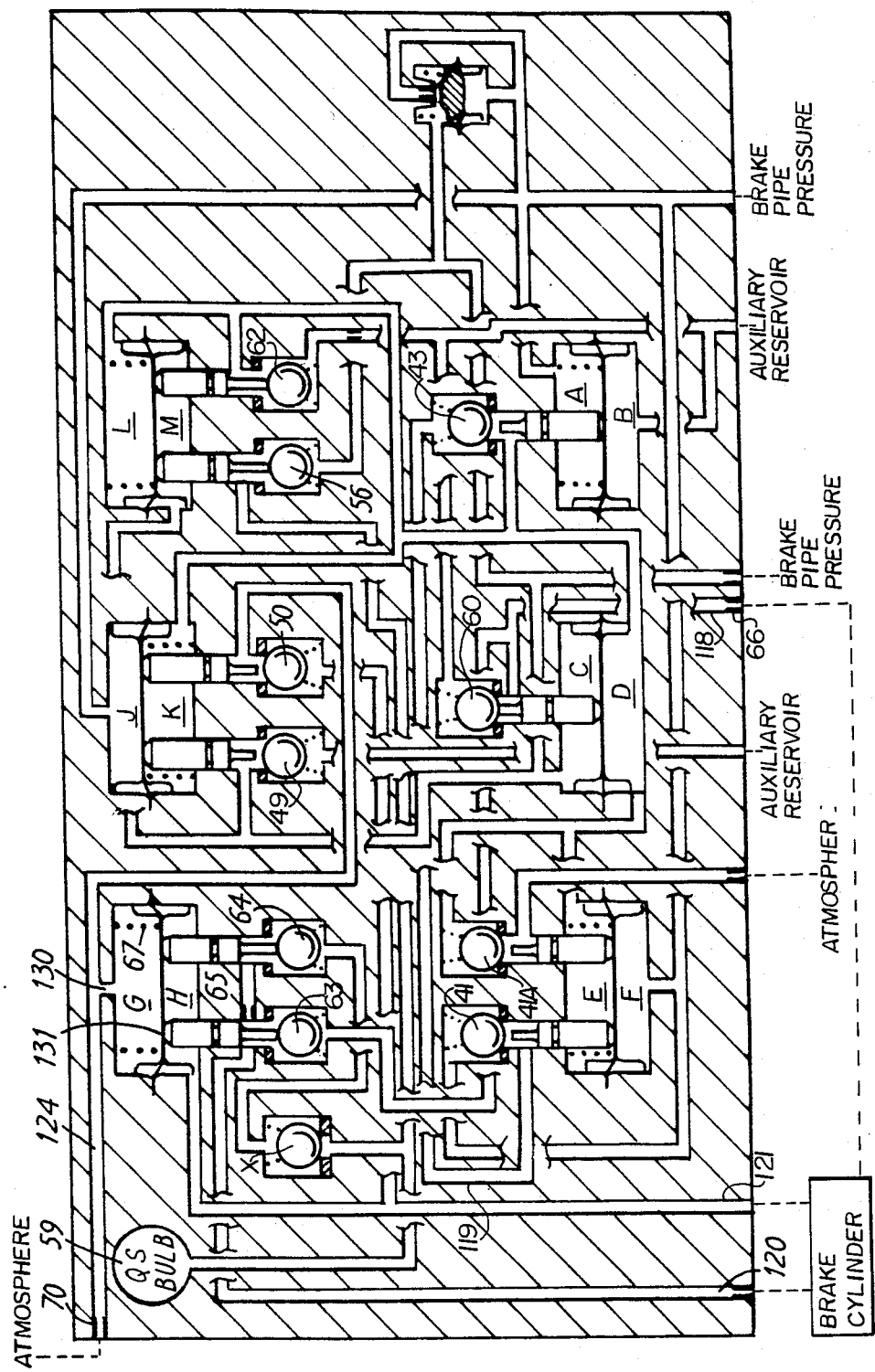

1

COMBINED BC PRESSURE-MAINTAINING VALVE AND QUICK SERVICE BULB EXHAUST VALVE

FIELD OF THE INVENTION

This invention relates to a valve assembly for a railway braking system and is particularly relevant to a system and valve assembly of the kind described and illustrated in our co-pending U.S. patent application Ser. No. 416,079 "Control Valve Arrangement".

SUMMARY OF THE INVENTION

In the above-identified co-pending application, the valve assembly includes a brake cylinder (or BC) maintaining valve which, during brake application, takes air pressure from the brake pipe (or BP) and feeds it into the brake cylinder until it reaches 10 p.s.i.—i.e. minimum brake application pressure. This 10 p.s.i. is maintained against leakage.

Brake pipe pressure is taken through a quick service (or QS) valve into the quick service bulb and then through a check valve into brake cylinder. The brake cylinder minimum pressure is then maintained from the quick service bulb which is in turn maintained by brake pipe pressure. When the brakes are released by an increase in brake pipe pressure, it is necessary to exhaust the pressure in the quick service bulb.

An object of the invention is to do this without introducing an extra valve, by using the natural porting to the brake cylinder.

In accordance with the present invention this object is achieved by employing the BC maintaining valve as a quick service bulb exhaust valve during brake release, and ensuring that the BC maintaining valve opens immediately on initiation of the brake release.

Thus, the brake cylinder pressure maintaining valve is caused to open as soon as release of the brakes is initiated. This is done by employing a back pressure which is set up as soon as the control valve goes to the brake release position.

By using the brake cylinder pressure maintaining valve as a quick service bulb exhaust valve, it is not necessary to provide a further valve as is usual to perform this function.

Whilst the BC maintaining valve would perform this function in a limited way without any further step, this would result in a poor situation regarding a re-application because the BC maintaining valve does not re-open until brake cylinder pressure has fallen to 10 p.s.i. This means that bulb pressure is held at full pressure until this point in time so a re-application of the bi-stable operator and a re-opening of the quick service valve cannot result in a further quick service action since the bulb is already full.

BRIEF DESCRIPTION OF THE DRAWING

The accompanying drawing illustrates one embodiment of the present invention. This drawing also appears as FIG. 2 of our co-pending application Ser. No. 416,079 and is fully described in the specification of that application. Only the parts of the drawing relevant to the present invention will be described in detail in this specification.

DETAILED DESCRIPTION OF THE PREFERRED EMBODIMENT

After the control valve is initially charged from brake pipe pressure, the following arrangement of the control valve exists:

(a) chambers G and H are at atmospheric pressure so that inshot valve 63 and BC maintaining valve 64 are open;

(b) chamber J is at the brake pipe pressure while chamber K is at atmospheric pressure such that auxiliary reservoir (AR) valve 49 and BC exhaust valve 50 are open;

(c) chamber M is at brake pipe pressure while chamber L is at atmospheric pressure such that quick service valve 56 and pilot maintaining valve 62 are closed;

(d) chambers A and B are at brake pipe pressure so that application valve 43 is closed;

(e) chamber C is at brake pipe pressure while chamber D is at atmospheric pressure such that pilot supply valve 41 and pilot release valve 41A are open.

Once the brakes have been applied by a decrease in brake pipe pressure, as described in the said co-pending application, pressure in the brake cylinder is maintained from the quick service bulb 59 through check valve X, open BC maintaining valve 64 and port 120.

As this occurs, the following arrangement of the control valve exists:

(a) the pressure in chamber A falls below chamber B and application valve 43 opens;

(b) the pressure in chamber J falls below chamber K and AR cutoff valve 49 and BC exhaust valve 50 close;

(c) the pressure in chamber F falls below chamber E and pilot supply valve 41 and application valve 41A close;

(d) the pressure in chamber M falls below chamber L and quick service valve 56 and pilot maintaining valve 62 open;

(e) the pressure in chamber D momentarily equals pressure in chamber C and BC inlet valve 60 remains closed;

(f) the pressure in chamber H is raised to the (falling) brake pipe pressure such that inshot valve 63 and BC maintaining valve 64 are held open. Any subsequent reduction in brake pipe pressure then causes BC inlet valve 60 to feed auxiliary reservoir pressure in the brake cylinder via port 118 and choke 66. Until the closure of the inshot valve 63, at approximately 10 p.s.i. in the brake cylinder, air also feeds via port 119, the open inshot valve 63 and port 120 into the brake cylinder. The BC inlet valve 60 is a self-lapping valve since reductions in brake pipe pressure below auxiliary reservoir pressure which cause the ball valve to open, also results in the auxiliary reservoir pressure being depleted. Hence the pressure in chamber D is depleted until such time as the pressures in chambers C and D are almost equalized and the ball valve 60 recloses.

In accordance with this invention BC exhaust pressure, taken from a point 125 after the BC exhaust valve 50, but before the BC exhaust choke 70, is directed to chamber G above the inshot and BC maintaining valve diaphragm 131. Since the pressure in port 124 upstream of the BC exhaust choke 60 attains a pressure well within 10 p.s.i. of chamber H which is connected to the brake cylinder via port 121, the spring 67 in chamber G can immediately open the BC maintaining valve 64. Thus, immediate opening of BC maintaining valve 64 occurs when the bi-stable operator (formed by valves 41, 41a, 43 and 62) moves to the release position as described more fully in our co-pending application. Bulb pressure from QS bulb 59 is then able to flow via BC maintaining valve 64 and the BC maintaining choke 65 and fall with the fall of brake cylinder pressure in port 120.

When the control valve is switched to the release condition by increasing brake pipe pressure, the following arrangement of the control valve exists:

(a) the pressure in chamber F increases above chamber E and pilot supply valve 41 and pilot release valve 41A are open;

(b) the pressure in chamber C rises above that of chamber D and BC inlet valve 60 closes;

(c) the pressure in chamber A rises above that of chamber B and application valve 43 closes;

(d) the pressure in chamber J rises above chamber K and AR cutoff valve 49 and BC exhaust valve 50 open;

(e) the pressure in chamber M rises above chamber L and quick service valve 56 and pilot maintaining valve 62 close; and (f) the pressure in chambers G and H are both the brake cylinder pressure so that inshot valve 63 and BC maintaining valve 64 open.

To summarize the position, when the control valve is "switched" to the release position by increasing brake pipe pressure it is necessary to exhaust the pressure in the QS bulb 59 in order to be ready for the next application and a separate valve is normally provided for this purpose. When the brake pipe pressure first increases, the QS valve 56 closes the connection between BP pressure and QS bulb 59, and almost simultaneously the BC exhaust valve 50 opens to cause BC pressure to fall to atmospheric pressure. It should be appreciated that in the normal arrangement, the BC maintaining valve 64 remains closed until BC pressure falls to 10 p.s.i. At this point it would open and allow QS bulb pressure to exhaust into BC thereafter to atmosphere. Owing to the need for BC pressure to fall to 10 p.s.i. at a controlled rate, this is unlikely to be satisfactory in practice, due to the unacceptable delay in starting to exhaust the bulb.

Thus, this invention provides a means for causing the BC maintaining valve 64 to open at the initiation of a release to enable QS bulb pressure to fall with BC pressure. To achieve this, BC exhaust pressure which is already directly applied to chamber H, after the BC exhaust valve 50, but before the 2.25 mm. exhaust choke is also applied above the BC maintaining valve 64 in chamber G, thus enabling the spring 67 on the diaphram 131 to overcome any small pressure difference still existing across the diaphragm 131 to open the BC maintaining valve 64 and equalize QS bulb pressure with the brake cylinder pressure.

I claim:

1. In a control valve assembly for a railway braking system which includes: a brake pipe pressure; a brake cylinder which is exhausted to release a brake and pressurized to apply the brake; and, a brake cylinder pressure-maintaining valve which, during brake application caused by reducing brake pipe pressure, takes air from a quick service bulb charged at the brake pipe pressure and feeds it into the brake cylinder until the pressure reaches a minimum brake application pressure; wherein the improvement comprises:

an exhaust means for employing the brake cylinder pressure-maintaining valve as a quick service exhaust valve for exhausting the pressure in the quick service bulb during brake release; and an opening means for immediately opening the brake cylinder pressure-maintaining valve on initiation of brake release.

2. An improved control valve assembly as claimed in claim 1 wherein said opening means is pressure operated by a back pressure created by the exhaust from the brake cylinder.

3. An improved control valve assembly as claimed in claim 2 wherein the control valve assembly further includes a brake cylinder exhaust valve means which opens upon an increase in brake pipe pressure for exhausting the brake cylinder and a brake cylinder choke downstream of the brake cylinder exhaust valve means which creates a back pressure from the exhaust from the brake cylinder exhaust valve means; and wherein the back pressure is derived from a point between the brake cylinder exhaust valve means and the brake cylinder choke.

* * * * *